(12) United States Patent
Koskinen

(10) Patent No.: US 7,494,303 B2
(45) Date of Patent: Feb. 24, 2009

(54) CUTTING INSERT AND A TOOL

(75) Inventor: Jorma Koskinen, Fagersta (SE)

(73) Assignee: Seco Tools AB, Fagersta (SE)

( * ) Notice: Subject to any disclaimer, the term of this patent is extended or adjusted under 35 U.S.C. 154(b) by 49 days.

(21) Appl. No.: 11/766,136

(22) Filed: Jun. 21, 2007

(65) Prior Publication Data

US 2008/0044241 A1    Feb. 21, 2008

(30) Foreign Application Priority Data

Jun. 21, 2006  (SE)  .................... 0601388

(51) Int. Cl.
 *B23B 1/00*  (2006.01)
 *B23B 3/00*  (2006.01)
(52) U.S. Cl. ........................ 407/113; 407/67
(58) Field of Classification Search ......... 407/113–117, 407/66, 67, 101, 103, 107
 See application file for complete search history.

(56) References Cited

U.S. PATENT DOCUMENTS

| | | | |
|---|---|---|---|
| 4,411,565 A * | 10/1983 | Hazra et al. ................. | 407/114 |
| 4,669,925 A * | 6/1987 | Lowe et al. ................. | 407/114 |
| 5,853,267 A * | 12/1998 | Satran et al. ................. | 407/113 |
| 5,924,824 A * | 7/1999 | Satran et al. .................... | 407/34 |
| 6,872,034 B2 | 3/2005 | Satran et al. | |
| 7,014,396 B2 | 3/2006 | Satran et al. | |
| 2005/0019109 A1 | 1/2005 | Deroche et al. | |
| 2005/0063792 A1 | 3/2005 | Satran et al. | |
| 2005/0214081 A1 | 9/2005 | Satran et al. | |

FOREIGN PATENT DOCUMENTS

| | | |
|---|---|---|
| WO | 0002693 A1 | 1/2000 |
| WO | 2005075135 A1 | 8/2005 |

OTHER PUBLICATIONS

International Search Report including Written Opinion of the ISA for corresponding International Application PCT/SE2007/050361.

* cited by examiner

*Primary Examiner*—Willmon Fridie
(74) *Attorney, Agent, or Firm*—WRB-IP LLP

(57) ABSTRACT

An indexable milling insert has a trigon shape and includes a mounting hole placed centrally in the milling insert, an upper side and a lower side, which sides are parallel with each other and act as an alternating first support surface and second support surface. The milling insert is furthermore provided with major cutting edges, which are oriented perpendicularly to the axis of the mounting hole as well as arranged in such a way that a turning of the milling insert around the center of the mounting hole into an alternative cutting position alternatively a flipping of the milling insert into an alternative cutting position provides an identical position of the major cutting edges in relation to a workpiece. The major cutting edges of the milling insert are furthermore placed in the milling insert, when the same is tangentially mounted in a cutting body, so that the shortest distance of the major cutting edges to the axis of the hole in top view is smaller than the distance of a third support surface to the axis of the hole. A milling cutter tool having such a milling insert mounted is also disclosed.

20 Claims, 3 Drawing Sheets

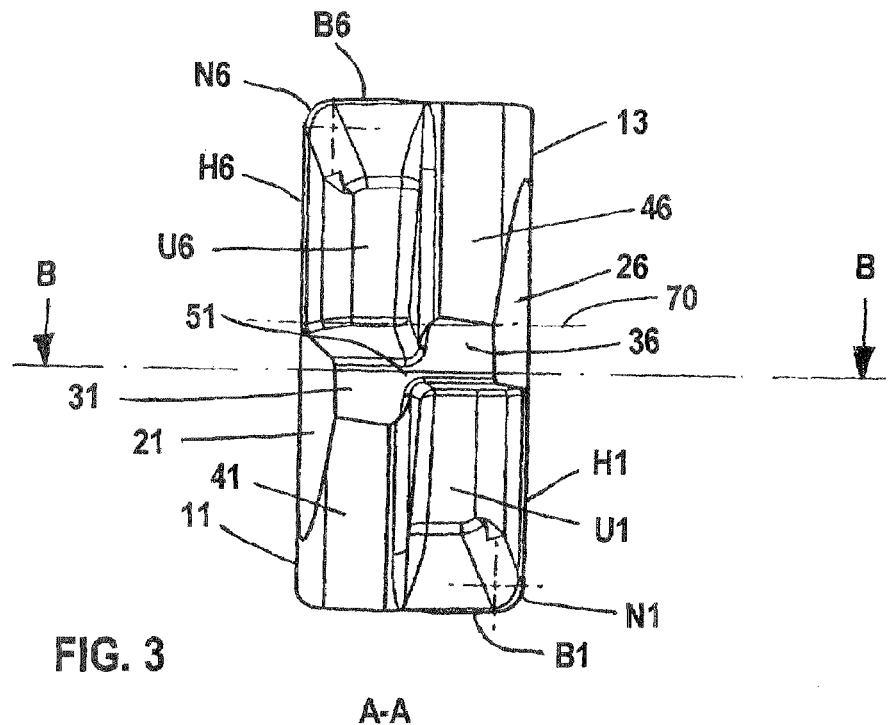
FIG. 3    A-A
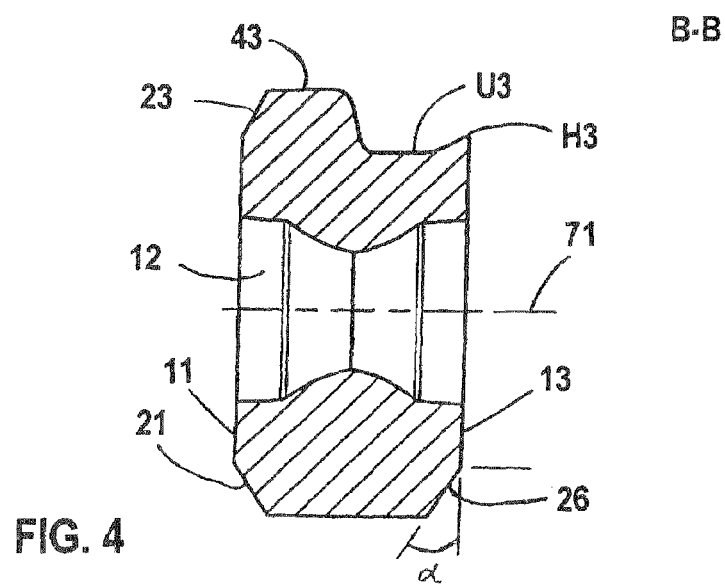
FIG. 4    B-B

CUTTING INSERT AND A TOOL

BACKGROUND AND SUMMARY

The present invention relates to the field of chip removing machining and particularly to a milling insert and a milling cutter tool in which the milling insert is mounted. The milling insert is shaped as a trigon shape having a number of cutting edges and is adapted to be mounted in a milling cutter body of the milling cutter tool.

Previously known trigon-shaped milling inserts are shaped to be mounted substantially radially in a milling cutter body, the axis of a centrally placed mounting hole being directed tangentially in relation to the milling cutter body. Such a mounting requires a considerable recess in the milling cutter body so that mounting of a milling insert could be accomplished, which in turn means that the milling cutter body at a certain radius only can receive a certain a number of milling inserts. Furthermore, radial mounting means that the strength of the milling insert to a certain extent depends on the extension thereof in the axial direction of the mounting hole.

Tangentially mounted milling inserts can be seen in, for instance, WO 2005/075135, U.S. Pat. No. 6,872,034 and U.S. Pat. No. 7,014,396.

It is desirable to provide an improved trigon-shaped milling insert, which can be mounted tangentially in the milling cutter body of a tool and which furthermore is provided with dedicated support surfaces for an improved abutment against a pocket of the milling cutter body.

It is also desirable that the support surfaces are placed on the milling insert as well as in the milling cutter body in such a way that the cutting forces in a milling operation contributes to an increased abutment against the pocket as well as to minimizing the torque to turn the milling insert radially out of the pocket.

It is also desirable to provide a milling cutter tool for such a milling insert.

An aspect of the invention relates to an indexable milling insert having a trigon shape, which milling insert comprises a mounting hole placed centrally in the milling insert, an upper side and a lower side, which sides are parallel with each other and act as an alternating first and second support surface. The milling insert is provided with major cutting edges, which are oriented perpendicularly to the axis of the mounting hole as well as arranged in such a way that a turning of the milling insert around the center of the mounting hole alternatively a flipping of the milling insert into an alternative cutting position provides an identical position of the major cutting edges in relation to a workpiece. In this connection, the major cutting edges of the milling insert are placed in the milling insert, when the same is tangentially mounted in a cutting body, in such a way that, in the shown top view, the shortest distance of the major cutting edges to the axis of the hole is smaller than the distance of a third support surface to the axis of the hole.

Furthermore, milling inserts may be shaped so that the distance in top view between each major cutting edge and an adjacent third support surface grows in the direction from an associated nose edge.

Furthermore, the milling insert may comprise three major cutting edges placed on the edge of the respective lower/upper side near a cutting corner.

The milling insert may be provided with third support surfaces placed along the sides of the milling insert at a right angle in relation to the imaginary extension of the first support surface.

The milling insert may be provided with additional third support surfaces placed along the sides of the milling insert at a right angle in relation to the imaginary extension of the second support surface.

The third support surfaces may be pair-wise arranged in direct connection with and on both sides of a cutting corner of the milling insert.

The milling insert may be provided with clearance surfaces placed in direct connection with the first support surface and the second support surface in the extension of the respective major cutting edges along the edge of the respective first and second support surface so that the clearance surfaces form an acute edge angle with the imaginary extension of the support surfaces.

The milling insert may be provided with corner surfaces placed at an angle to and in direct connection with the third support surfaces and at a right edge angle in relation to the imaginary extension of the first and the second support surface.

The milling insert may furthermore be shaped so that each corner surface and adjacent third support surface connect to each other under an angle $\beta$, where $10°<\beta<20°$, preferably is $13°<\beta<17°$. Furthermore, a milling insert may be shaped so that each major cutting edge forms an angle $\phi$ with the appurtenant third support surface, which angle $\phi$ is of the same size as the angle $\beta \pm 2°$.

All support surfaces of the milling insert may be completely planar.

The major cutting edge of the milling insert may also transform directly into a nose edge.

The milling insert may furthermore comprise six minor cutting edges, each one having an extension from the first support surface toward the second support surface at a substantially parallel orientation with the symmetry axis of the mounting hole.

The milling insert may also be shaped so that each minor cutting edge is of the same size as the third support surface in a direction parallel with the axis of the hole. Each minor cutting edge may also connect directly to a nose edge.

Furthermore, all cutting edges connected to each other may be situated in the same plane.

An aspect of the invention also relates to a milling cutter tool comprising a milling cutter body having a plurality of insert pockets. Each insert pocket is intended to receive a milling insert shaped according to anyone of the above-mentioned milling inserts.

The insert pockets of the milling cutter tool may comprise a main support surface against which the milling insert is arranged to abut by the first/second support surface thereof.

The insert pocket of the milling cutter tool may also comprise a wedge-shaped support pocket having primary support surfaces arranged, in which support pocket the milling insert is mounted with abutment of the pair-wise arranged third support surfaces thereof against the primary support surfaces in order to, by means of arising cutting forces in a milling operation, provide an increased abutment force of the milling insert against the support pocket.

The support pocket of the milling cutter tool may furthermore be provided with a secondary support surface against which another one of the third support surfaces of the milling insert is arranged to abut.

BRIEF DESCRIPTION OF THE DRAWINGS

The invention will now be described closer by means of embodiment examples, reference being made to the accompanying drawings, where FIG. 3 shows a side view of the milling insert, FIG. 4 shows a cross section of the milling insert according to line B-B in FIG. 1 and FIG. 3.

DETAILED DESCRIPTION

With reference to FIGS. 1-4, there are shown a double-sided or indexable milling insert according to the present invention, which has a trigon-shaped or hexagonal basic shape as well as is manufactured from directly pressed cemented carbide. With "cemented carbide", reference is here made to WC, TiC, TaC, NbC, etc., in sintered combination with a binder metal such as, for instance, Co or Ni. The milling insert is preferably at least partly coated with layers of, e.g., Al2O3, TiN and/or TiCN. In certain cases, it may be justified that the cutting edges consist of or comprise soldered superhard materials such as CBN or PCD.

Figure 1:
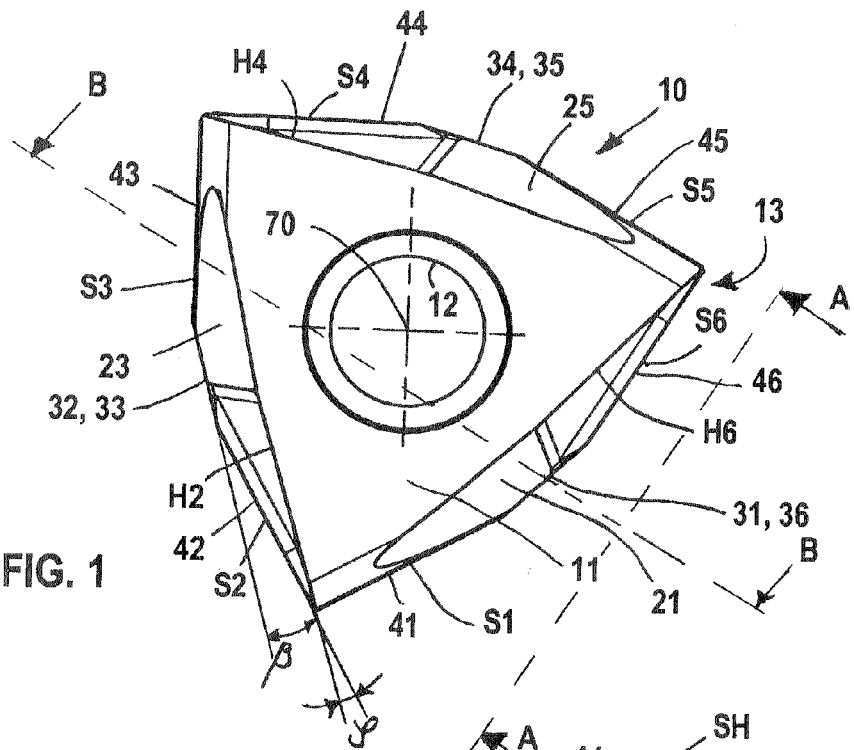
FIG. 1 shows a milling insert according to the present invention in top view.

FIG. 1 shows a trigon-shaped milling insert 10, by which is meant that the milling insert, in top view, is substantially triangular but that each side of the triangle is broken outward from the center of the triangle in order to form two sides of each one of the sides of the triangle, which means that the milling insert has obtained six corners, the tip angles of the triangle having been made more obtuse. The two sides form an angle between themselves in the interval of 25°-35°, preferably 28°-31°. Another way of describing a trigon-shaped milling insert is that an imaginary circle inscribed in the milling insert touches the periphery of the milling insert in six points. However, the present milling insert has every second of the six corners chamfered in order to form corner surfaces that are seen more clearly below. Thus, the milling insert comprises six sides S1, S2, S3, S4 S5, S6, each one of which comprises a major cutting edge, H1, H2, H3, H4, H5, H6, three major cutting edges H2, H4, H6 of which are shown in FIG. 1 in direct connection with an upper side constituting an upper first support surface 11, while the other three major cutting edges H1, H3, H5 are found on the lower side of the milling insert. For the mounting of the milling insert 10 in an insert pocket, a mounting hole 12, including the axis 70 thereof, is provided centrally in the milling insert 10. In direct connection with the upper support surface 11 of the milling insert, three clearance surfaces 21, 23, 25 are provided at the sides S1, S3, S5, which clearance surfaces form the angle α with the upper support surface 11. Correspondingly, in direct connection with the opposite lower second support surface 13 of the milling insert, three additional clearance surfaces 22, 24, 26 (not visible in FIG. 1) are provided at the sides S2, S4, S6, which additional clearance surfaces also form the angle α with the second support surface 13. The first support surface 11 and the second support surface 13 have substantially the shape of an equilateral triangle.

Figure 2:
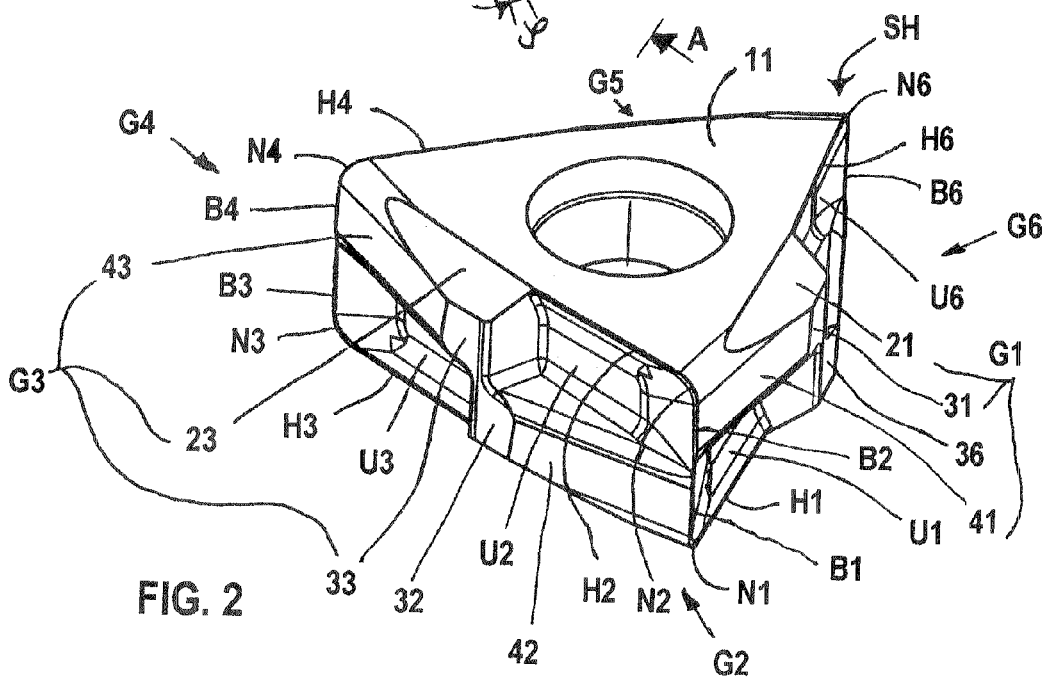
FIG. 2 shows the milling insert in perspective view.

FIG. 2 shows in a perspective view the upper first support surface 11 of the milling insert, the first major cutting edge H1 of the milling insert, the second major cutting edge H2 of the milling insert, the third major cutting edge H3 of the milling insert, the fourth major cutting edge H4 of the milling insert, and the sixth major cutting edge H6 of the milling insert. Furthermore, the figure shows that each major cutting edge H1-H6 transforms into a nose cutting edge N1-N6, the first N1, the second N2, the third N3, the fourth N4 and the sixth N6 one of which nose cutting edges are shown in the figure. Furthermore, it is shown in the figure that each nose cutting edge N1-N6 connects directly to a minor cutting edge B1-B6, the first B1, the second B2, the third B3, the fourth B4 and the sixth B6 one of which minor cutting edges are shown in the figure. The minor cutting edges form the three cutting corners SH of the milling insert. All edges are situated in the same plane. To each major cutting edge H1-H6 and minor cutting edge B1-B6, a chip breaking countersunk recess U1-U6 connects, the first U1, the second U2, the third U3 and the sixth U6 one of which recesses are shown in the figure. These in relation to the edges countersunk recesses, give the edges a positive rake angle so as to cut easily in a workpiece. The first 21 and the third one of the clearance surfaces 21-26 are also shown in the figure.

Furthermore, corner surfaces 31-36 are provided in direct connection with the respective clearance surfaces 21-26 and placed as additional sides of the milling insert so that the first 31 and the sixth 36 one of the corner surfaces are placed between the sides S1 and S6. Correspondingly, the second 32 and the third 33 one of the corner surfaces are placed between the sides S2 and S3, and the fourth 34 and the fifth 35 one of the corner surfaces are placed between the sides S4 and S5, compare with FIG. 1.

Furthermore, FIGS. 1 and 2 show third support surfaces 41-46, which are situated on the six sides of the milling insert with an axial extension that is smaller or equal to half the thickness of the milling insert so that the first 41 one of the third support surfaces is situated on the first side S1 of the milling insert, the second 42 one of the third support surfaces is situated on the second side S2 of the milling insert, the third 43 one of the third support surfaces is situated on the third side S3 of the milling insert, the fourth 44 one of the third support surfaces is situated on the fourth side S4 of the milling insert, the fifth 45 one of the third support surfaces is situated on the fifth side S5 of the milling insert, and the sixth 46 one of the third support surfaces is situated on the sixth side S6 of the milling insert. All the third support surfaces may be planar and intended to absorb tangential forces on the milling insert. Also the clearance surfaces 21-26 may be planar.

The first 21 one of the clearance surfaces, the first 31 one of the corner surfaces and the first 41 one of the third support surfaces form a first group G1 of surfaces, which, via the first 21 one of the clearance surfaces, connect to the upper first support surface 11. As is seen in FIG. 1 and FIG. 2, the corresponding groups G3 and G5 connect to the upper first support surface, and the groups G2, G4 and G6 to the opposite lower second support surface 13.

The corner surfaces 31-36 and the third 41-46 support surfaces are perpendicular in relation to both the upper first 11 and the lower second 13 support surface, which means that the upper 11 and the lower 13 support surface are parallel with each other. However, the corner surfaces 31-36 and the third 41-46 support surfaces within each group connect to each other under an angle β, where 10°<β<20° and preferably is 13°<β<17°, see FIG. 1. Thus, the corner surfaces and the third support surfaces, respectively, form the angle 90°+α with the clearance surface within each group G1-G6.

Furthermore, in FIG. 1, an angle φ is indicated, which shows the angle between a major cutting edge H1-H6 and an appurtenant third 41-46 support surface, which angle φ is of the same size as the angle β±2°.

FIG. 3 shows a side view of the milling insert where the upper support surface 11 is parallel with the lower support surface 13. The figure also shows the first major cutting edge H1 with the appurtenant first nose cutting edge N1 and first minor cutting edge B1, as well as the sixth major cutting edge H6 with the appurtenant sixth nose cutting edge N6 and sixth minor cutting edge B6. Furthermore, the figure shows the first chip-breaking recess U1 as well as the sixth chip-breaking recess U6 diagonally situated in relation to the first chip-breaking recess U1 in the shown view. The figure also shows the diametrical position of the group G1 including the clearance surface 21, the corner surface 31 and the support surface 41 in relation to the group G6 including the surfaces 26, 36, 46. The other two side views of the milling insert are arranged in a corresponding way as shown in FIG. 3 when the milling insert is rotated one third of a revolution at a time around the axis 70 of the mounting hole. The figure also shows that the two corner surfaces 31, 36 are connected to each other by a waist 51, which contributes to a distribution of possible stresses over the corner surfaces 31, 36. In a corresponding way, also other corner surfaces are pair-wise connected to each other by a corresponding waist.

It should also be noted that all clearance surfaces 21, . . . , 26 end at a distance from the nose cutting edges in order to contribute to a strengthening of the milling insert in this portion. Compare also FIGS. 1 and 2.

FIG. 4 shows a section B-B according to FIG. 3 and according to the dashed line in FIG. 1 through the mounting hole 12 but beside the axis 70, the projection of which in the mounting hole 12 has been indicated by the numeral 71. The figure shows the clearance surfaces 21, 23 and 26, which all form the angle α with the upper and lower support surface 11, 13, respectively, where 20°<α<45° preferably that 25°<α<40°. The third clearance surface 23 transforms into the third 43 one of the third support surfaces. The figure also shows the third chip-breaking recess U3 and the third major cutting edge H3.

Figure 5:
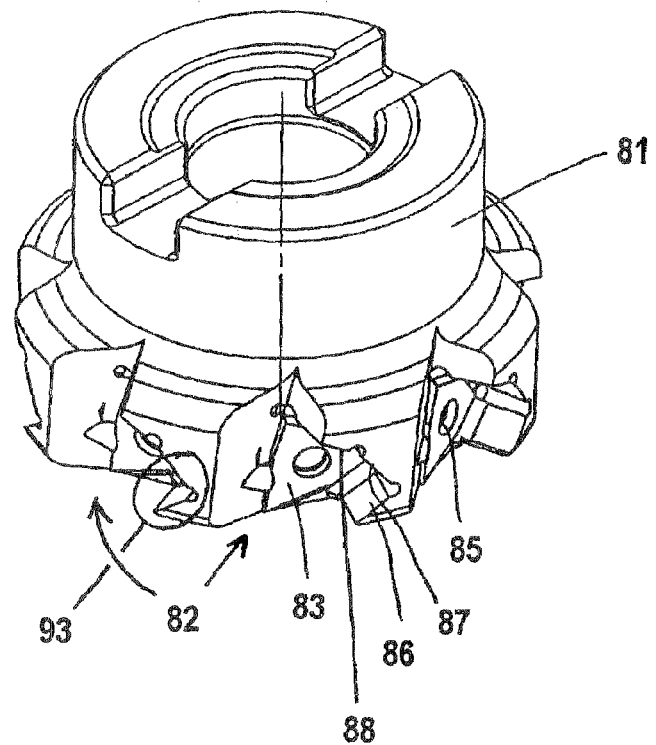
FIG. 5 shows a perspective view of a milling cutter body according to the present invention without any milling inserts mounted.

FIG. 5 shows a milling cutter body 81, without any milling inserts mounted, for a milling cutter tool according to the invention. The milling cutter body is provided with a plurality of identically shaped insert pockets 82, each one of which is provided with a main support surface 83 against which a milling insert is arranged to be mounted by a screw 84, see FIG. 6, being screwed-in through the mounting hole of the milling insert into a threaded fastening hole 85 in the insert pocket of the milling cutter body 81. The insert pocket 82 is provided with two primary support surfaces 86, 87 as well as with a secondary support surface 88. Together, the primary support surfaces form a wedge-shaped support pocket 93, against which the third support surfaces of the milling insert abut after an assembly, and against which the milling insert is pressed by the tangential cutting forces when the milling cutter tool machines a workpiece. The secondary support surface 88 does also contribute to a force absorption of cutting forces on the milling insert, but has above all the purpose of facilitating mounting of the milling insert in the insert pocket 82.

Figure 6:
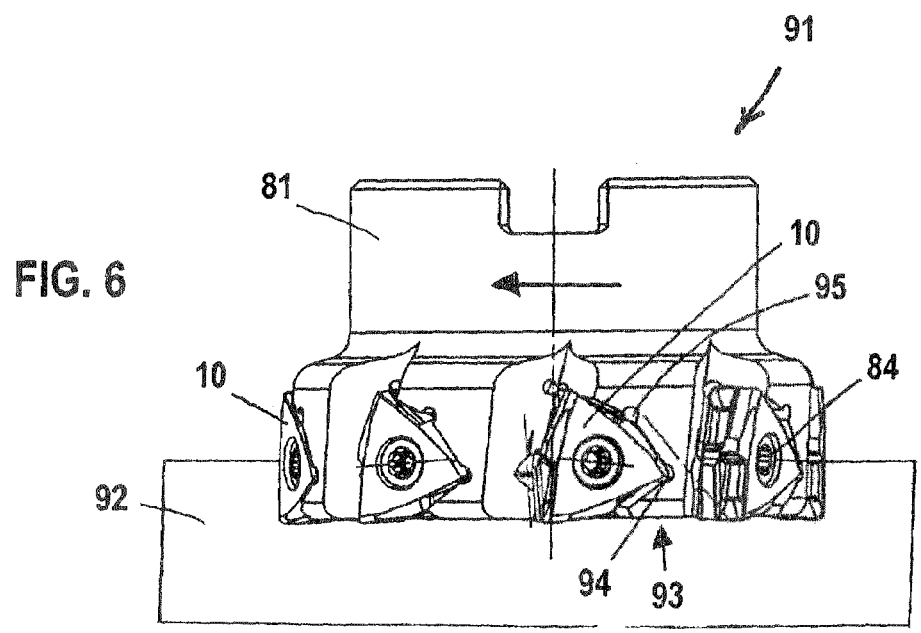
FIG. 6 shows a side view of the milling cutter body having mounted milling inserts in engagement with a workpiece.

FIG. 6 shows a milling cutter tool 91, in the form of a cutting body 81 having a number of mounted milling inserts 10, during machining of a workpiece 92. The direction of rotation of the milling cutter tool 91 is shown by the arrow, the translation motion of the milling cutter tool upon milling being into the plane of the paper. In this connection, the milling insert 10 is mounted with one of the cutting corners SH thereof placed for abutment by the support surfaces thereof in the corresponding primary support surfaces 86, 87 of the wedge-shaped support pocket 93 of the insert pocket. Between the abutment surfaces 86, 87, 88 of the insert pocket 82, clearances 94, 95 are provided to eliminate stresses between the surfaces as well as to eliminate point loads from the corner surfaces of the milling insert.

Thus, the present invention relates to an economically advantageous milling insert for milling, which allows a stable location of the milling insert in the milling cutter body for a milling cutter tool, as well as to a milling cutter tool for such a milling insert.

The milling cutter tool is intended to be used for end milling or for face milling.

The invention is not limited to the embodiment described above but may be varied within the scope of the subsequent claims.

The disclosures in Swedish patent application No. 0601388-2, from which this application claims priority, are incorporated herein by reference.

The invention claimed is:

1. An indexable milling insert having a trigon shape, the milling insert comprising a mounting hole placed centrally in the milling insert, an upper side and a lower side, which sides are parallel with each other and act as an alternating first support surface and second support surface, and major cutting edges, the major cutting edges being oriented perpendicularly to an axis of the mounting hole as well as arranged in such a way that each of a turning of the milling insert around a center of the mounting hole into an alternative cutting position and a flipping of the milling insert into an alternative cutting position provides an identical position of the major cutting edges in relation to a workpiece, wherein the major cutting edges of the milling insert are provided on the milling insert such that, when the insert is tangentially mounted in a cutting body, a shortest distance of the major cutting edges to the axis of the mounting hole in top view is smaller than a distance of a third support surface to an axis of the hole.

2. Milling insert according to claim 1, wherein the distance in top view between each major cutting edge and an adjacent third support surface grows in a direction from a nose edge associated with the major cutting edge.

3. Milling insert according to claim 1, wherein the milling insert comprises three major cutting edges placed on edges of the respective lower and upper sides near a cutting corner.

4. Milling insert according to claim 1, wherein the milling insert is provided with third support surfaces placed along the sides of the milling insert at a right angle in relation to an imaginary extension of the first support surface.

5. Milling insert according to claim 4, wherein the milling insert is provided with additional third support surfaces placed along the sides of the milling insert at a right angle in relation to an imaginary extension of the second support surface.

6. Milling insert according to claim 5, wherein the third support surfaces are pair-wise arranged in direct connection with and on both sides of a cutting corner of the milling insert.

7. Milling insert according to claim 1, wherein clearance surfaces are disposed in direct connection with the first support surface and the second support surface in an extension of the respective major cutting edges along the edge of the respective first and second support surface, the clearance surfaces forming an acute edge angle with an maginary extension of the support surfaces.

8. Milling insert according to claim 1, wherein the milling insert is provided with a corner surface placed at an angle to and in direct connection with the third support surface and at a right edge angle in relation to an imaginary extension of the first and second support surface.

9. Milling insert according to claim 1, wherein each corner surface and adjacent third support surface connect to each other under an angle β, where 10°<β<20°, preferably is 13°<β<17°.

10. Milling insert according to claim 9, wherein each major cutting edge forms an angle φ with the appurtenant third support surface, which angle φ is of the same size as the angle β±2°.

11. Milling insert according to claim 1, wherein all support surfaces are planar.

12. Milling insert according to claim 1, wherein each major cutting edge transforms into a nose edge.

13. Milling insert according to claim 1, comprising six minor cutting edges, each minor cutting edge having an extension from the first support surface toward the second support surface at a substantially parallel orientation with a symmetry axis of the mounting hole.

14. Milling insert according to claim 13, wherein each minor cutting edge is of the same size as the third support surface in a direction parallel with the axis of the hole.

15. Milling insert according to claim 13, wherein each minor cutting edge connects directly to a nose edge.

16. Milling insert according to claim 2, wherein all cutting edges connected to each other are situated in the same plane.

17. A milling cutter tool comprising a milling cutter body having a plurality of insert pockets, wherein each insert pocket is intended to receive a milling insert shaped according to claim 1.

18. Milling cutter tool according to claim 17, wherein each insert pocket comprises a main support surface against which the milling insert is arranged to be abutted by the first and second support surfaces thereof.

19. Milling cutter tool according to claim 17, wherein each insert pocket comprises a wedge-shaped support pocket having primary support surfaces, the milling insert being mounted in the support pocket with abutment of pair-wise arranged third support surfaces thereof against the primary support surfaces in order to, by means of arising cutting forces in a milling operation, provide an increased abutment force of the milling insert against the support pocket.

20. Milling cutter tool according to claim 19, wherein each support pocket furthermore is provided with a secondary support surface against which another one of the third support surfaces of the milling insert is arranged to abut.

* * * * *